(12) United States Patent
Rössl

(10) Patent No.: US 12,086,781 B2
(45) Date of Patent: *Sep. 10, 2024

(54) DISPLAY DEVICE FOR DISPLAYING A PRICE AND/OR PRODUCT INFORMATION

(71) Applicant: VusionGroup GmbH, Fernitz-Mellach (AT)

(72) Inventor: Andreas Rössl, Graz (AT)

(73) Assignee: VusionGroup GmbH, Fernitz-Mellach (AT)

( * ) Notice: Subject to any disclaimer, the term of this patent is extended or adjusted under 35 U.S.C. 154(b) by 0 days.

This patent is subject to a terminal disclaimer.

(21) Appl. No.: 17/836,022

(22) Filed: Jun. 9, 2022

(65) Prior Publication Data

US 2022/0300931 A1 Sep. 22, 2022

Related U.S. Application Data

(63) Continuation of application No. 16/060,350, filed as application No. PCT/EP2015/079193 on Dec. 10, 2015, now Pat. No. 11,392,916.

(51) Int. Cl.
*G06Q 20/20* (2012.01)
*G06K 19/02* (2006.01)
*G06K 19/07* (2006.01)

(52) U.S. Cl.
CPC ......... *G06Q 20/203* (2013.01); *G06K 19/027* (2013.01); *G06K 19/0705* (2013.01);
(Continued)

(58) Field of Classification Search
CPC .................................................. G06Q 20/20
See application file for complete search history.

(56) References Cited

U.S. PATENT DOCUMENTS

| 5,468,942 A * 11/1995 Oosterveen ............ G07G 3/003 235/462.43 |
| 5,671,362 A * 9/1997 Cowe ........................ G07F 7/00 340/568.1 |

(Continued)

FOREIGN PATENT DOCUMENTS

| CA | 2207631 A1 * 4/1997 |
| CN | 102024130 A * 4/2011 |

(Continued)

OTHER PUBLICATIONS

De Mil, Pieter et al. "Design and Implementation of a Generic Energy-Harvesting Framework Applied to the Evaluation of a Large-Scale Electronic Shelf-Labeling Wireless Sensor Network." EURASIP journal on wireless communications and networking 2010.1 (2010): 343690-343690. Web. (Year: 2010).*

(Continued)

*Primary Examiner* — Ashford S Hayles
(74) *Attorney, Agent, or Firm* — Studebaker & Brackett PC

(57) ABSTRACT

The invention relates to a display device (2-19) comprising a storage stage (50) for storing a product data set (PD1-PD3) which was received in a communication with a base station (25, 26) via a first radio interface (44) of the display device (2-19), and comprising a second radio interface (45) for communication in particular for RFID or NFC communication, with a self-checkout device (57), which display device (2-19) is designed to process a self-checkout request received from a self-checkout device (57) for the purpose of transmitting the product data set (PD) via the second radio interface (45).

11 Claims, 5 Drawing Sheets

US 12,086,781 B2
Page 2

(52) U.S. Cl.
CPC .......... *G06Q 20/20* (2013.01); *G06Q 20/204* (2013.01); *G06Q 20/206* (2013.01)

(56) References Cited

U.S. PATENT DOCUMENTS

| | | | | |
|---|---|---|---|---|
| 5,880,449 | A * | 3/1999 | Teicher | G07G 1/145 235/383 |
| 5,995,015 | A * | 11/1999 | DeTemple | G07G 1/145 340/8.1 |
| 6,105,004 | A * | 8/2000 | Halperin | G06Q 10/087 705/28 |
| 6,269,342 | B1 * | 7/2001 | Brick | G06F 3/147 235/383 |
| 6,397,199 | B1 * | 5/2002 | Goodwin, III | G06Q 20/203 235/383 |
| 6,434,530 | B1 * | 8/2002 | Sloane | G07G 1/0081 705/16 |
| 6,696,920 | B1 * | 2/2004 | Goodwin, III | G06Q 20/20 705/16 |
| 6,715,675 | B1 * | 4/2004 | Rosenfeld | G09F 3/204 235/383 |
| 6,736,316 | B2 * | 5/2004 | Neumark | G06K 17/0022 705/28 |
| 6,859,786 | B1 * | 2/2005 | Goodwin, III | G06Q 20/201 235/382 |
| 7,026,913 | B2 * | 4/2006 | Bhyravabhotla | G06Q 30/06 340/5.91 |
| 7,152,040 | B1 * | 12/2006 | Hawthorne | G06Q 30/0207 705/14.1 |
| 7,461,009 | B1 * | 12/2008 | Haulk | G06Q 20/201 705/16 |
| 8,577,728 | B2 * | 11/2013 | Jones | G06F 3/147 705/16 |
| 9,792,468 | B2 * | 10/2017 | Rößl | G06K 7/10029 |
| 10,535,094 | B2 * | 1/2020 | Joppi | A47F 5/0043 |
| 2002/0139847 | A1 * | 10/2002 | Goodwin, III | G07G 1/145 235/383 |
| 2002/0143635 | A1 * | 10/2002 | Goodwin, III | G06Q 20/20 705/22 |
| 2003/0225624 | A1 * | 12/2003 | Haulk | G06Q 10/087 705/23 |
| 2004/0012485 | A1 * | 1/2004 | Sundqvist | G06F 3/147 340/5.91 |
| 2004/0035927 | A1 * | 2/2004 | Neumark | G06Q 10/087 235/385 |
| 2005/0149414 | A1 * | 7/2005 | Schrodt | G06Q 10/087 705/29 |
| 2005/0152108 | A1 * | 7/2005 | Goel | G06Q 10/087 361/679.01 |
| 2005/0205670 | A1 * | 9/2005 | Natori | G06Q 30/06 235/383 |
| 2005/0218218 | A1 * | 10/2005 | Koster | G06F 3/147 235/383 |
| 2005/0246238 | A1 * | 11/2005 | Dvorak | G06Q 30/06 705/26.9 |
| 2005/0284933 | A1 * | 12/2005 | McGill | G06Q 30/06 235/383 |
| 2006/0085268 | A1 * | 4/2006 | Imendorf | G06Q 30/00 705/16 |
| 2006/0149640 | A1 * | 7/2006 | Gordon | G06Q 30/0605 705/26.81 |
| 2006/0163349 | A1 * | 7/2006 | Neugebauer | G06Q 20/387 235/383 |
| 2006/0176239 | A1 * | 8/2006 | Sweeney | G06F 3/147 345/1.2 |
| 2007/0040025 | A1 * | 2/2007 | Goel | G06K 19/0723 235/383 |
| 2008/0005036 | A1 * | 1/2008 | Morris | G01G 23/3735 705/64 |
| 2008/0186167 | A1 * | 8/2008 | Ramachandra | G06Q 10/0875 340/572.1 |
| 2008/0191011 | A1 * | 8/2008 | Mochizuki | G06Q 20/20 235/383 |
| 2008/0191878 | A1 * | 8/2008 | Abraham | G06Q 20/12 340/572.1 |
| 2008/0284566 | A1 * | 11/2008 | Zai | G06Q 30/02 340/7.56 |
| 2010/0065632 | A1 * | 3/2010 | Babcock | G06Q 10/087 705/28 |
| 2010/0070365 | A1 * | 3/2010 | Siotia | G06Q 30/0251 705/28 |
| 2010/0138322 | A1 * | 6/2010 | Nakamura | G06Q 30/02 705/28 |
| 2010/0287057 | A1 * | 11/2010 | Aihara | G06K 7/1095 705/16 |
| 2011/0025461 | A1 * | 2/2011 | Nobutsugu | G06Q 10/087 340/5.92 |
| 2011/0084951 | A1 * | 4/2011 | Karhuketo | G06F 3/147 345/211 |
| 2011/0186633 | A1 * | 8/2011 | Okabe | G06Q 10/08 235/492 |
| 2011/0191154 | A1 * | 8/2011 | Johnson | G06Q 30/0241 705/14.4 |
| 2011/0193679 | A1 * | 8/2011 | Okabe | H04B 10/1149 340/5.9 |
| 2011/0225071 | A1 * | 9/2011 | Sano | G06Q 10/087 705/28 |
| 2011/0240731 | A1 * | 10/2011 | Lee | G06Q 30/06 235/375 |
| 2011/0320293 | A1 * | 12/2011 | Khan | G06Q 20/3278 705/16 |
| 2012/0055985 | A1 * | 3/2012 | Allen | G06Q 10/087 235/375 |
| 2012/0080517 | A1 * | 4/2012 | Braunstein | G07F 9/026 235/379 |
| 2012/0126982 | A1 * | 5/2012 | Lee | G06Q 30/06 340/572.1 |
| 2012/0173351 | A1 * | 7/2012 | Hanson | G06Q 30/0635 705/26.81 |
| 2012/0310744 | A1 * | 12/2012 | Kim | G06Q 30/02 705/14.65 |
| 2012/0326849 | A1 * | 12/2012 | Relihan | G07G 1/145 340/10.6 |
| 2013/0048721 | A1 * | 2/2013 | Rasband | G06F 16/9554 235/383 |
| 2013/0093591 | A1 * | 4/2013 | Campero | G06K 7/0008 340/572.1 |
| 2013/0117153 | A1 * | 5/2013 | Shen | G06Q 30/0241 705/28 |
| 2013/0126610 | A1 * | 5/2013 | Aihara | G06Q 20/322 235/383 |
| 2013/0138520 | A1 * | 5/2013 | Hu | G06F 3/147 705/17 |
| 2013/0140357 | A1 * | 6/2013 | Ure | G06F 16/7867 235/375 |
| 2013/0313317 | A1 * | 11/2013 | Waters | G06Q 10/08 235/487 |
| 2014/0139548 | A1 * | 5/2014 | Byers | G06F 3/1431 345/619 |
| 2014/0149256 | A1 * | 5/2014 | Kim | G06Q 30/0623 705/26.61 |
| 2014/0156367 | A1 * | 6/2014 | Aihara | G06Q 30/0214 705/14.16 |
| 2014/0201042 | A1 * | 7/2014 | Meyer | G06Q 10/087 705/28 |
| 2014/0224867 | A1 * | 8/2014 | Werner | H04L 67/306 235/375 |
| 2014/0258051 | A1 * | 9/2014 | Bostwick | G06Q 20/203 705/28 |
| 2014/0316901 | A1 * | 10/2014 | Grabovski | G06Q 30/0268 705/14.65 |
| 2014/0372254 | A1 * | 12/2014 | Aragane | G06Q 30/0631 705/26.61 |
| 2015/0034719 | A1 * | 2/2015 | Wei | H04W 72/0453 235/383 |
| 2015/0035674 | A1 * | 2/2015 | Karhuketo | G08B 13/242 340/568.1 |
| 2015/0134429 | A1 * | 5/2015 | Katakwar | G06Q 30/0207 705/14.1 |

(56) References Cited

U.S. PATENT DOCUMENTS

| | | | |
|---|---|---|---|
| 2015/0178643 A1* | 6/2015 | Park | G06Q 10/02 705/5 |
| 2015/0301778 A1* | 10/2015 | Lim | G06F 3/147 361/679.21 |
| 2015/0341352 A1* | 11/2015 | Jun | H04B 5/77 235/383 |
| 2015/0356610 A1* | 12/2015 | Ponoth | G06Q 30/0261 705/14.58 |

FOREIGN PATENT DOCUMENTS

| | | | | | |
|---|---|---|---|---|---|
| CN | 102165411 | A | * | 8/2011 | G06F 3/147 |
| CN | 202351903 | U | * | 7/2012 | |
| CN | 204028969 | U | * | 12/2014 | |
| CN | 104394604 | A | * | 3/2015 | H04W 84/18 |
| CN | 105096076 | A | * | 11/2015 | |
| EP | 1818864 | A1 | * | 8/2007 | G06Q 10/087 |
| EP | 2026307 | A2 | * | 2/2009 | G07G 1/0036 |
| EP | 2309378 | A2 | * | 4/2011 | G06F 3/147 |
| EP | 2431954 | A1 | * | 3/2012 | G06Q 20/20 |
| EP | 2765551 | A1 | * | 8/2014 | G06F 16/2291 |
| EP | 2887343 | A2 | * | 6/2015 | G09G 3/20 |
| GB | 2344025 | A | * | 5/2000 | G06K 17/00 |
| JP | 2005231772 | A | * | 9/2005 | |
| JP | 2007081746 | A | * | 3/2007 | G06K 7/0008 |
| JP | 2007319522 | A | * | 12/2007 | |
| JP | 2009091102 | A | * | 4/2009 | |
| JP | 2015102988 | A | * | 6/2015 | |
| KR | 20160045995 | A | * | 4/2016 | |
| WO | WO-9631833 | A1 | * | 10/1996 | G06Q 10/087 |
| WO | WO-0199073 | A1 | * | 12/2001 | G06Q 20/201 |
| WO | WO-2004055686 | A2 | * | 7/2004 | G06F 15/025 |
| WO | WO-2008032360 | A1 | * | 3/2008 | G06Q 30/02 |
| WO | WO-2010082835 | A1 | * | 7/2010 | G06Q 30/0603 |
| WO | WO-2010121110 | A1 | * | 10/2010 | G06Q 10/00 |
| WO | WO-2010137883 | A2 | * | 12/2010 | G06K 7/0008 |

OTHER PUBLICATIONS

Notice of References Cited in U.S. Appl. No. 16/060,350, the parent application herein. All references therein have been provided to or were acquired by the USPTO during the pendency of the application.

* cited by examiner

DISPLAY DEVICE FOR DISPLAYING A PRICE AND/OR PRODUCT INFORMATION

RELATED APPLICATIONS

This application claims priority benefit of U.S. application Ser. No. 16/060,350, filed Jun. 7, 2018 and now graned, which is a 371 of International Application No. PCT/EP2015/079193 filed Dec. 10, 2015, the contents of which are hereby incorporated by reference.

TECHNICAL AREA

The invention relates to a display device for displaying a price and/or product information, a self-checkout device for carrying out a self-checkout, and to a self-checkout system.

BACKGROUND

A known display device, also called an electronic price display label, also an "Electronic Shelf Label" in professional jargon, abbreviated ESL, has an operational radio contact, with a base station. The display device is supplied via this radio contact with price and/or product information and renders them visual with its display device. The ESL is usually fastened to a shelf rail of a shelf on which the particular product is stored and/or offered to which the price and/or product information corresponds. Products can be provided with a "Radio Frequency-Identification Device" (abbreviated MD) label and/or bar code for its identification. A customer selects products for purchase, places them into his shopping cart, moves with the shopping cart to the checkout counter and places the products onto a conveyor belt for being detected for billing. There, the products, if provided with RFID labels, are either detected with the aid of an RFID reading device (RFID reader) or, if provided with a bar code, with the aid of a barcode reading device and a ticket which lists the products and associated prices is prepared. The payment of the total price takes place by the customer by cash payment, credit card or by a mobile phone capable of "Near Field Communication" (abbreviated NFC) with an appropriate payment application (payment software) on the mobile phone.

Providing products with RFID labels and installing an RFID reader at every checkout counter for detecting the products is relatively expensive. In addition, the RFID-detection of the products at the cashier for billing proved to be unreliable and slow. Products which were not, detected have to be moved past the RFID reader again or manually detected with the aid of its barcode. In any case, products which are not suitable for being provided with an RFID label must be manually detected, which takes place either with the aid of the product barcode or by manually entering a product number of the product into the payment system or by selecting the product at the payment system. This results in unsatisfactory processing courses (slow detection, susceptibility to errors, etc.).

Therefore, the invention has the task of eliminating the initially cited problems and of making it possible to more efficiently detect the products.

SUMMARY OF THE INVENTION

This task is solved by a display device according to claim 1. The subject matter of the invention is therefore a display device comprising a storage stage for storing a product data set which was received in a communication with the base station via a first radio interface of the display device, and a second radio interface for the communication, in particular for the RFID communication or NFC communication, with a self-checkout device, wherein the display device is designed for processing a self-checkout request received from a self-checkout device for the transfer of the product data set via the second radio interface.

In addition, the task is solved by a self-checkout device according to claim 11. The subject matter of the invention is therefore a self-checkout device comprising a device radio interface which is compatible with the second radio interface of a display device according to claim 1 and is for the communication, in particular for the RFID or NEC communication, with this display device, and is a control stage for controlling a self-checkout request via the device radio interface to the display device for transmitting a product data set, from the display device via the device radio interface to the self-checkout device.

The task in additionally solved by a self-checkout system according to claim 15. The subject matter of the invention is therefore a self-checkout system comprising a base station for communicating with a number of display devices according to the invention and at least one display device according to the invention and at least one self-checkout device according to the invention.

The task in additionally solved by a usage according to claim 16. The subject matter of the invention is therefore a usage of a display device according to the invention for the spatially localized making an individual product, data set available in a self-checkout system for the local transmission of the product data set from the display device to a self-checkout device querying the display device with the aid of a self-checkout request.

The measures according to the invention have the advantage that an existing infrastructure of a system of electronic display devices, in particular electronic price display labels, also called "Electronic Shelf Labels" in professional jargon, subsequently abbreviated as ESLs can be used as a system component for the self-checkout or self-payment (designated as "self-checkout system in professional jargon).

A product data set can consist of a number of bits, bytes or larger data amounts or structure. The product data set can have a link which makes it possible for the self-checkout device receiving the product data set to request information about the product and/or its price via another communication connection (e.g., an Internet connection with a product description data server and/or product price data server via WLAN or UMTS). However, the product data set itself preferably comprises the information about the product and/or its price for being directly further processed.

These ESL are fastened in the sales areas of the self-service individual seller to the shelves on which the products associated with them are standing. Now, if the customer wishes to buy a product, he takes it off the self and holds his self-checkout device (e.g., his appropriately equipped smartphone) in the vicinity of the ESL or contacts the ESL with it. The self-checkout device on which a self-checkout application is being processed makes contact with the second radio interface of the ESL with the aid of its device radio interface and transmits a self-checkout request to the ESL, e.g., with the aid of a self-checkout command which is recognized there and processed. Then the ESL reacts with a transfer of the product dataset via the second radio interface to the self-checkout device, which assumes the further processing of the product dataset.

In contrast to known self-checkout systems in which the checkout, procedures for all items to be detected usually take place in a central checkout desk, the individual checkout procedure for the product concerned takes place substantially at the location of the ESL (therefore, at the shelf location where the product is stored) with which the product is associated.

The ESL and its communication infrastructure (base station and the merchandise management system coupled to it) therefore form part of a self-checkout system, wherein several ESL are used for making available the spatially distributed individual product datasets at those locations where the particular products are located. The distribution of the product datasets to the individual ESL's takes place automatically and can be readily and dynamically adapted at any time to the situation present in the self-service store. If, e.g., a product leaves a shelf and another product is slipped in there, the new product dataset can be immediately communicated to the ESL present there by communicating via the base station.

It should be advantageously emphasized here that electronic product labels fastened on or integrated into the particular products are superfluous and that the individual products therefore no longer have to be provided with individual RFID labels. This entails a significant savings potential and also solves the ecological and logistic problem of recycling such electronic product chains. Also, the detection procedure of the products is significantly accelerated because the products are detected directly on their shelf by the customer, that is, are checked out.

If the individual product and price information is made available as such in the ESL with the aid of the product data set, the self-checkout can take place offline, that is, without an additional Internet connection in the self-checkout device. This ensures problem-free and rapid checkout processes and protects against criminally motivated influences.

In addition, the total purchasing procedure is made significantly more transparent for the customer because he makes the checkout himself and therefore always has a complete survey of and control of the checked-out items. Therefore, the problem of a possible erroneous checkout at the checkout desk (e.g., by an automatic RFID-based or a manual checkout supported by the personnel) which is often perceived as disturbing by the customer is completely avoided.

The second radio interface can be constructed for capacitive and/or inductive communication. It can be constructed for communication according to a Bluetooth specification (e.g., defined by SIG) or also according to a ZigBee specification. However, the relatively wide radio range is rather problematic for both communication types since it requires a user interaction for the selection of different available communication partners (ESL's) when their communication areas overlap.

According to a preferred embodiment the second radio interface is constructed for communication according to an RFID specification (or an RFID standard) such as, for example, ISO/IEC 10536, 14443, 15693, 10373 or VDI 4470, 4472 or ISO/IEC 18000 or EPCglobal or ISO/IEC 15961, 15962 or future specifications. It proved to be especially advantageous if the second interface for the communication is constructed according to an NFC specification such as, for example, ISO/IEC 13157, -16353, -22536, -28361 or future specifications. In these embodiments in particular the relatively short radio range (max. about 10, especially 5 centimeters) proved to be very advantageous because it requires a spatially unambiguous association, established by the customer himself, between the particular ESL and the self-checkout device for carrying out a self-checkout.

A self-checkout device can be, e.g., a portable medium reproduction device without telephone functionality, a smartphone, a smartwatch or also an easy to handle tablet computer with appropriate device radio interface. Its control stage is realized with the aid of a processor on which an appropriate software or application runs which controls the self-checkout request, concretely builds up a connection with the display device with the aid of the appropriate communication protocol, sends a self-checkout request command to the latter, receives response data from it and processes further in the sense of the self-checkout.

Other especially advantageous embodiments and further developments of the invention result from the dependent claims and the following description. Features and corresponding advantages which were mentioned in connection with a category of the claims can also be provided in another category of the claims or come into effect there.

The ESL comprises a display module for displaying price and/or product information. The display model can comprise a first microcontroller which substantially realizes the processing stage, comprises a battery which makes a supply voltage of, e.g., three volts available and supplies the display module. The microcontroller can comprise an internal memory or also be connected to an external memory. The microcontroller can comprise as a component of the first radio interface, an integrated coprocessor as well as other electronic components for realizing the first radio interface or can be coupled to them so that the communication is carried out according to a first radio communication protocol with the aid of the coprocessor. This is associated with a first antenna of the first radio interface. In addition, the hardware of the display module comprises a display device which can comprise a second microcontroller coupled to the first microcontroller in order to autonomously take care of display-specific tasks delegated to it by the first microcontroller. The display device can be realized with the aid of LCD technology, but preferably also with extremely energy-saving electronic ink technology (also E-ink as a synonym for electronic paper).

The first communication protocol used in the first radio interface can be realized, for example, according to the "Zig-Bee" standard, the "Bluetooth" standard or also according to a proprietary protocol. The first radio interface and optionally also the processing stage have a corresponding design of the hardware and a suitable software that is carried out on this hardware in order to allow the communication according to the particular communication protocol.

According to a preferred exemplary embodiment, a proprietary radio communication protocol is used in the first radio interface which implements a time slot communication method with the aid of which several ESL's can communicate with a base station-4 base station serves as interface between a cable-bound communication with, e.g., a data processing device (e.g., a server) and a communication without cable with other devices, in the present case the ESL's. According to this protocol, the ESL's can at first be registered in a base station and/or be associated with it in order to be able to be used for a radio communication with this base station. During the registration a predefined, individual time slot for the communication with the base station is assigned to each ESL. E.g., 15 seconds, m time slots, 255 time slots are used within n seconds. The n seconds form a time slot cycle which is continuously repeated and is also called a synchronization cycle. Therefore, m time slots within a synchronization cycle are available in this time slot communication method for a communication with ESL's. Each of the ESL's is associated with one of the time slots, wherein even several ESL's can be associated, e.g., 2, 3 or 4 ESL's with a certain time slot. 4 synchronization cycles with 255 time slots each exist within one minute so that with, e.g., 2 ESL's per time slot a total number of 2040 ESL's can be addressed. If several base stations are installed in the sales rooms of an individual store, groups of ESL's which are associated with the particular base station can be controlled.

The ESL's can be synchronized for the first time with the aid of a synchronization signal structure (e.g., a relatively short signal at the beginning of the particular time slot) transmitted by the base station in each of the time slots with the time pattern of the time slot communication method in order to start the communication operation with the base station, re-synchronized during the course of the operation if they lost the synchronous state due to any circumstances, and remain synchronous if rather small deviations from the synchronous state are present which are caused by inaccuracies such as, e.g., a drift of their inner clock. According to the first communication protocol, each time slot is characterized by an unambiguous time slot signal, wherein the base station is constructed for emitting a synchronization data signal comprising the time slot symbol for the instantaneously present time slot. The ESL is designed for changing from a sleep mode or rest mode, called a short sleep mode in the following, into an active mode at a wake-up time and receives the synchronization data signal in the active mode. If the received time slot signal displays a time slot determined for the ESL, the ESL defines a new wake-up time corresponding to the next occurrence of the time slot determined for itself in a time slot cycle following the instantaneously present time slot cycle.

Each ESL determines its synchronism with the base station only by the circumstance of the recognition of the time slot symbol which occurs at the time expected by it and/or in an expectation time window and displays the time slot determined for the ESL. After the ESL has determined its synchronism as previously explained, it is basically sufficient if it changes back into the sleep mode because the next wakeup time is automatically known by the time pattern of the time slot communication method which pattern is known to him. The defining of the new wakeup time can therefore be limited to the fact that a, e.g., time control stage (e.g., a timer) of the ESL is restarted with the timing parameter already used previously for changing from the sleep mode into the active mode. Afterwards, the ESL can be changed back into the sleep mode and remain there until, initiated by the time control, a wakeup and changing from the sleep mode into the active mode is again carried out at the new wakeup time in the next time slot cycle. However, the ESL does not necessarily remain in the sleep mode for the remainder of the time slot determined for it but rather can also process other tasks in an active mode during the time slot or also during the time slot cycle. The previously discussed time control then operates in the background independently of its other activities. The time slot symbol can basically be selected as desired. It proved to be especially advantageous if the time slot symbol is formed with the aid of a hardware address of the ESL which unambiguously identifies the ESL, preferably by the low-value bits or the lowest value byte of the hardware address.

In addition, the ESL comprises another radio module connected to it electronically and with this second radio interface.

The display module, in particular the first microcontroller, is coupled to the other radio module. The second radio module can comprise, in addition to the hardware necessary for the physical transmission of signals to the radio communication, its own, third microcontroller as well as its own memory. If the second radio interface is designed according to an RFID or NFC specification, it can generate the supply voltage necessary for its operation from the received signals and be operated independently of this battery.

If a product data set is present in the ESL and there is no limitation regarding its availability, the product data set is transmitted as a result of the received self-checkout request by the ESL to the self-checkout device.

The product data set can be stored in the display module in a memory determined for the microcontroller of the display module. The access to this memory can take place from the first microcontroller, which, however, presupposes its active operating state. However, if a communication protocol is being used for the lowest possible energy-saving operation of an ESL, as previously discussed, it is advantageous if the access to this memory takes place from the third microcontroller, which forms a component of the other radio module. If, for example, the third microcontroller is supplied with energy as a consequence of an RFID or NFC communication with the aid of the radio signals necessary for the communication, the second microcontroller can read out and transmit the product data set without loading the internal battery of the ESL. It is especially advantageous if the energy supply realized with the aid of the radio signals also supplies this memory in which the product data set is stored. This can be realized in such a manner that given the presence of such an (external) radio signal-based energy supply with the aid of suitable switching means, even this memory in the display module can be coupled to this energy supply. It is especially preferable if the memory which stores the product data set is a memory of the other radio interface and the first microcontroller has access to this memory for applying or changing the product data set by the display module.

The ESL according to the invention can query the storage state of the product concerned by the self-checkout queries with the aid of the first radio interface in the framework of the self-checkout request. This can be advantageous for showing the correct storage state in the central merchandise management system of the individual merchant. This can also solve the problem of an apparently out-of-stock product on the shelf. If it turns out, namely, that the processing of this query, e.g., by the merchandise management system shows that the concerned product is still available in the warehouse, this can be subsequently communicated via the second radio interface to the self-checkout device or a coworker of the store can be commissioned to restock the particular product. Therefore, the wish to buy of a customer can be satisfied just in time.

According to another aspect of the invention the memory stage comprises an availability data set linked to the product data set and with the aid of which the availability of the product data set can be controlled, and the display device is designed to check the availability data set in processing the self-checkout request and to only transmit the product data set when it is available. The availability data set therefore embodies control data for controlling the availability of the product data set upon a self-checkout request. Also, the availability data set can consist of a number of bits, bytes or larger data amounts or structure similar to the product data set. The availability data set can be a component of the product data set or exist separately from the latter, in particular also stored in the same memory as the product data set or in another memory of the display device. The availability data set or its controlling contents would also have been received in a communication with the base station via the first radio interface or, if it had already existed in the ESL, it would have been activated or appropriately adapted to the particular requirements. However, the display device can also be designed to independently control the availability of the product data set with the aid of the availability data set in order to display the correct availability of the product data set. This can be especially advantageous if in the particular situation a communication behavior of the display module which was optimized regarding a low energy consumption would result in unacceptable delays in the manipulation or adjustment of the availability data set.

It is advantageous for a basic availability control if the availability data set concerns the availability of the product data set as such and if the display device is designed to check the availability display arrangement to see whether the product data set can be transmitted or not according to its availability, and to appropriately process the request. A global adjustment can be carried out, for example, via the first radio interface with this measure. Therefore, for example, the fact that the product data set is not available can reflect the circumstance that the shelf is empty because all products had already been removed from the shelf. It is especially advantageous if the ESL has a counting stage which counts how often the product data set was queried, which, in the context of the self-checkout means the same as the number of products removed from the shelf. If the ESL also comprises a product number memory in which the number of products originally present on the shelf is stored, the number of the removed products can be determined by a simple comparison of the number of the removed products with the number of the products originally present on the shelf to see whether the shelf must already be empty and consequently no other product data set should be available anymore for transmission via the second radio interface. The ESL can then autonomously suppress the availability of the product data set, that is, make the appropriate adjustment in the availability data set. The global availability of the product data set can be represented, for example, by a status bit in the memory. The content of the product number memory can be changed with the aid of the base station and be defined according to an initial position (e.g., 20 products were originally on the shelf).

It is also advantageous in the framework of the controlling of the availability of the product data set if the availability of the product data set concerns an availability in time in which this product data set is available, and if the display device is designed to check the availability data set to see whether the product data set is available limited in time, and whether the request can be processed within the available time with this product data set or outside of the availability in time with another product data set or with a different content (or no product data set at all) or not at all or in some other way, such as, e.g., by internal registering and/or communication to the merchandise management system. For example, offers for a product which are limited in time can be defined with the aid of this implementation of the availability. Therefore, the particular product can be more favorable, for example, in the time from 11:00 to 14:00 by 10% than in the remaining opening time of the supermarket. A data-related availability of different product data sets can also be controlled in an analogous manner. Therefore, different product data sets (normal price with the exception of the Oct. 24, 2014, to which a Christmas discount is valid) are transmitted at different times for a self-checkout request. If the product should already be sold out due to the high demand, no product data set is transmitted for the self-checkout request.

According to another aspect of the invention the availability of the product data set concerns the availability of its amount, and the display device is designed to check the availability data set to see whether the product data set is limited in its amount, and to process the request within the limitation of the amount with this product data set and, if the limitation of the amount is exceeded, to process it with another product data set or another content (or no product data set at all) or not at all or in some other manner, such as, e.g., by internal registration and/or communication to the merchandise management system. For example, offers for a product which are limited by the amount can be defined with the aid of this implementation of the availability. Therefore, for example, the first 100 pieces of the product concerned can be 10% more advantageous than the remaining number of the particular product. Even in this case the previously mentioned counting stage can be used with advantage so that it can be autonomously determined by the ESL by counting the self-checkout requests how many items of the product have already been sold.

However, it proved to be especially advantageous if the previously mentioned limitation in time of the availability is combined with the limitation of the amount of the availability. With the aid of this implementation of the availability, an offer for a product can be defined which is limited in time and in amount. Thus, the first 100 items of the particular product in the time window of 8:00 to 10:00 can be 10% more favorable than the remaining amount of product.

According to another aspect of the invention the display device is designed to receive and store user and/or device identification data for the identification of the user of the self-checkout device and/or of the self-checkout device when processing a self-checkout device. The storing can take place in such a manner that the identification data itself is stored for each request. However, the storing can also take place in such a manner that upon a first request the identification data itself is stored and in the case of further requests with already stored identification data a counter state in the ESL associated with this already existing identification data is raised. In order to optimize the using of the memory of the ESL, the stored identification data and counter states can be automatically canceled after a predefined time or after the passing of a predefined time span such as, e.g., every day at 23:55 o'clock, or after one week. It is especially advantageous if the user identification data and the device identification data form an unambiguous recognition for each user and his device. Therefore, for example, an email address of the user can be used for the unambiguous identification of a user and/or for being able to distinguish him from other users. Also, an unambiguous hardware address (for example, a MAC address) can be used for the identification of a device and finally for the unambiguous differentiation of this device from other devices. The self-checkout device is preferably designed to transmit this identification data upon every self-checkout request, which data can be locally stored in the ESL for the direct or further processing.

The using of the identification data proved to be especially advantageous if the display device is designed to check the availability of the amount, taking into account a limitation of the amount per user or per self-checkout device. With this implementation of the availability, the available amount of an offer can be controlled at the user level or the device level. In this manner, for example, a coupon system can be realized in which a price reduced by 10% compared to the normal price can be used only, e.g., ten times and not be claimed more often, which corresponds to ten redeemable coupons for a certain device or a user.

The using of the identification data also proved to be advantageous if the display device is designed to check the availability in time, taking into account a limitation of the amount per user or per self-checkout. In this manner, for example, a coupon system can be realized in which a price reduced by 10% compared to the normal price can be claimed only, e.g., ten times and not more often for a certain device or a user but only, however, in the time between Jan. 1, 2015, 8:00 and Jun. 1, 2015, 18:00.

Therefore, a corresponding product data set for this device or this user is available only according to the cited limitation.

According to another aspect of the invention the display device is designed to send the identification data to the base station upon a communication via the first radio interface. With the aid of this measure the interaction between the individual ESL's and different self-checkout devices also becomes transparent for the merchandise management system of the self-service store or for other data processing systems and can be used there for other measures or analyses.

It proved to be especially advantageous in this connection that the display device is designed to emit only the identification data to the base station for which a confirmation of a user of the self-checkout device is present as a consent for storing or self-checkout of the product data set received by the display device, especially a confirmation of a user of the self-checkout device for carrying out a self-checkout in the sense of a payment transaction for the product, to which the product data set belongs. A widespread technical problem of modern, Internet-based search engines can be solved with this measure. Users use their very varied devices in order to search for information about very different products in the Internet with the aid of these search engines. Results are supplied by the search engines during this search. Whether a user now uses these results in order to actuate a purchase or not of a previously searched product in a store, e.g., in his local surroundings, remains unknown, however, for the search engines and their users. The search engines only have the information that a certain user or a certain device, both identified by this identification data, which is also transmitted during the search in the Internet, made a search for a certain product. It is now possible for the first time with the aid of the measures according to the invention to solve this problem since the identification data received via the base station is forwarded directly or via a merchandise management coupled to the base station or via a billing system of a self-service market to an Internet-based search engine and/or to the data processing system of its operator. The identification data which was obtained during the self-checkout request is matched with the data which was stored during the Internet-based product search. Since at least devices which are used during the Internet-based search and in the interaction on site on the self with a display device can be unambiguously identified with the aid of the identification data and consequently can be classified as identical, it can be unambiguously clarified in the Internet-based search machine whether and where a product search for on the Internet was also actually locally purchased.

According to another aspect of the invention the self-checkout device comprises a detection stage for detecting a confirmation of a user of the self-checkout device as a consent to store a product data set received by the display device. The detection stage can be realized by a key, a speech recognition unit or by a unit for recognizing movements of the device or also movements of the user. It is preferably realized with the aid of a fingerprint sensor. The control stage cooperates with the detection stage or forms a unit with it and is constructed in such a manner that it that it only carries out the storing (that is, the self-checkout) of the product data set obtained as a consequence of the self-checkout request from the display device upon a detected actuation.

The self-checkout device comprises in an especially preferred manner a product list memory stage which can be accessed with the aid of the control stage. This memory stage serves to store one or more product data sets. Therefore, all product data sets transmitted by the individual display devices are present in the self-checkout device available as a list, e.g., in the form of an electronic sales receipt as the result of the self-checkout procedures. This memory stage is preferably integrated in the second radio interface or is associated with it.

In order to realize a complete self-service in a self-serve store from the selection of the merchandize to the payment procedure, the control stage is designed in the framework of the self-checkout for carrying out a payment transaction for a product data set transmitted by a display device, preferably only when a consent of a user for it was detected in the self-checkout device with the aid of the detection stage.

Therefore, individual payment transactions for each product data set can be carried out, in particular directly during the transmitting from an ESL, or also a block payment transaction for a group or list of product data sets which were collected in the case of individual transmissions from the ESL. Such a stored list of product data sets can be released by the user of the self-checkout device at any time for billing or payment.

The payment can take place with the aid of payment methods stored in the self-checkout device, e.g., cash payment with monetary units stored in the self-checkout device or by credit card payment. The pertinent, selected payment method can be used at the exit from the supermarket by communication via the device interface with a payment terminal. The payment can also take place with the aid of an e.g., Internet-based communication with a payment service performer.

An electronic sales receipt contains, e.g., a list with prices and product information which was transmitted with the aid of the product data sets as well as contains the payment data and/or payment information being used.

These and other aspects of the invention result from the figures discussed below.

BRIEF DESCRIPTION OF THE FIGURES

The invention is discussed again in detail in the following with reference made to the attached figures; however, the invention is not limited to them. In the various figures the same components are provided with identical reference numerals. The figures schematically show.

DESCRIPTION OF THE EXEMPLARY EMBODIMENTS

Figure 1:
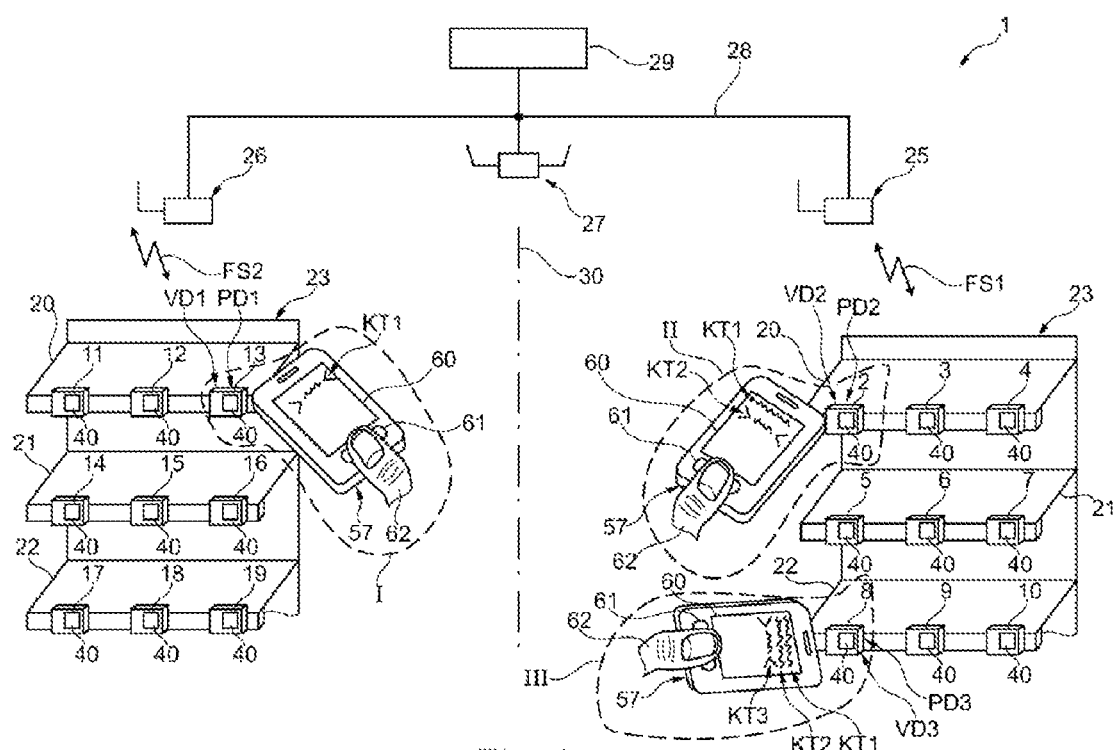
FIG. 1 shows a system according to the invention.

FIG. 1 shows a system 1 installed in the rooms of a supermarket for the radio communication with electronic price display labels, abbreviated in the following as ESL 2-10 and ELS 11-19 realizing display devices with the aid of which a self-checkout system is realized. Each ESL 2-19 has a display 40 and is attached on shelf bottoms 20-22 of a shelf 23 corresponding to products (not shown) positioned on the shelf bottom, with the aid of which the price information and product information is displayed for the products. The system also comprises two base stations 25 and 26, wherein the first base station 25 with the ELS 2-10, symbolized by first radio signals FS1, and the second base station 26 with the ELS 11-19, symbolized by second radio signals FS2, stand in radio contact with the aid of a proprietary first communication protocol. The logical association (e.g., by different radio channels) of the groups of ESL 1-10 and 11-19 to the particular base station 25, 26 is visualized with the aid of the line 30. It is also mentioned at this point that no spatial separation of the radio ranges must be present, as was represented in FIG. 1 for reasons of clarity. The radio ranges can also overlap (e.g., in the areas). Furthermore, the system 1 comprises a WLAN access point, abbreviated in the following as access point 27, which, centrally represented, covers the two ranges with radio technology to the left and the right of the line 30. However, several access points 27 can also be present for supplying the entire sales area with radio technology. Communications relative to merchandise management can be carried out with portable merchandise management devices which are not shown. The access point 27 and the two base stations 25, 26 are connected by a wired network 28 to a merchandise management system server 29 of the supermarket.

Figure 2:
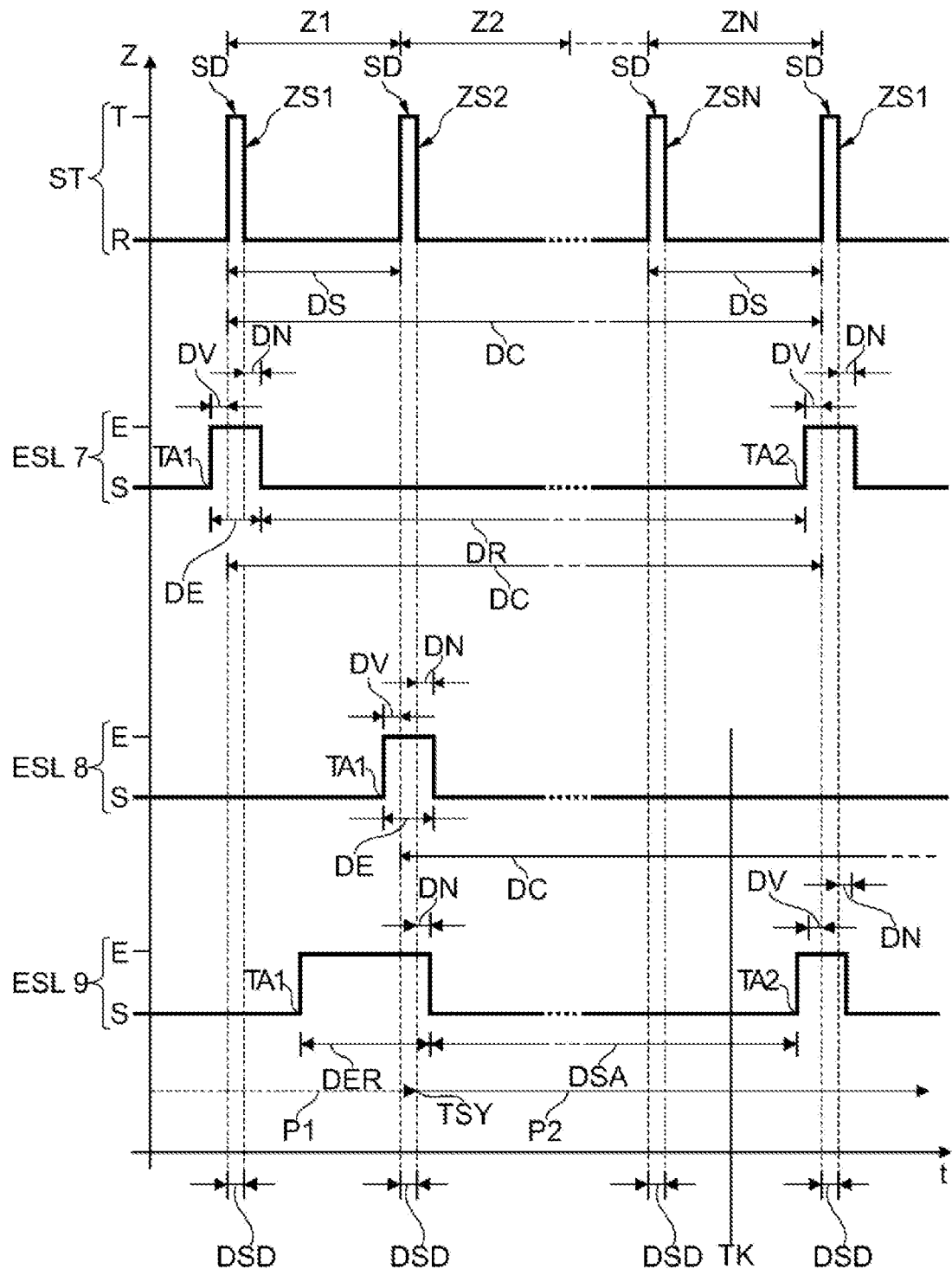
FIG. 2 shows a status diagram for explaining a proprietary communication protocol.

The first communication protocol used in the system 1 for the communication according to a timeslot communication method will be discussed in the following with the aid of FIG. 2. The status diagram comprises the time t on the abscissa axis and on the ordinate axis the communication states of the exemplary, cited ESL 7-9 in the first, base station 25. T shows a transmission state and R shows a receiving state of the base station 25 and E shows an active state ready for reception and S shows an energy-saving sleep state of ESL's 7-9 in which there is no reception.

During a timeslot cycle duration DC (e.g. 15 seconds) N timeslots Z1 . . . ZN (e.g. 256) with the identical timeslot duration DS (e.g., circa 58 milliseconds) are available. During the timeslot cycle duration DC the base station 25 (characterized with the symbol "ST") alternates between the transmitting state T and the rest state R. The transmitting state T is always taken at the beginning of a time slot Z1 . . . ZN and maintained for a synchronization data signal duration DSD (or transmitting time duration DSD of the synchronization data signal SD) in order to transmit the particular appropriate time slot symbol ZS1, ZS2, . . . ZSN with the particular synchronization data signal SD. The running number of the particular time slot Z1 . . . ZN in the sequence of the occurrence of the time slots Z1 . . . ZN is used as the particular time slot symbol ZS1 . . . ZSN. Consequently the first time slot Z1 is characterized in hexadecimal notation (characterized by "Hex") by the time slot symbol Hex 00, the second time slot Z2 by the time slot symbol Hex 01, etc., and the last time slot ZN (in the present example the two hundred fifty-sixth time slot Z256) by the time slot symbol Hex FF.

The first ESL 7 is present in the synchronous state. It wakes up at a first wakeup time TA1 out of its sleep state S and changes with a relatively short lead time DV before an expected occurrence of a synchronization data signal SD into its receiving-ready active state E, receives the synchronization data signal SD during a receiving time duration DE with the first time slot symbol ZS1 (Hex 00), determines by comparison of the lowest value byte B0 of its hardware address (Hex 00) with the received timeslot symbol ZS1 that the first time slot Z1 determined for the first ESL 7 is displayed (agreement of the bytes to be compared: B0 of the hardware address and first time slot symbol ZS1), retains the parameters of its time control stage used for controlling the waking up for the waking up in the following timeslot cycle for the definition of the new wakeup time point and changes with a relatively short follow-up time DN back into the sleep state S in order to wake up after passage of the provided sleep state dwell time DR according to the plan at the new (second) wakeup time TA2 with this lead time VD before the repeated beginning of the first time slot cycle Z1. The same applies in an analogous manner to the second ESL 8, which is also present, like the first ESL 7, in the synchronous state.

The third ESL 9 is present, before a synchronization time period TSY in the asynchronous state which is indicated by the arrow P1 with an interrupted line running parallel to the time axis. It wakes up at a randomly selected first wakeup time TA1 and changes from its sleep state S into the receiving-ready active state E and waits in this state until receiving the next occurrence of the synchronization data signal SD, wherein in the present case the second time slot symbol ZS2 (Hex 01) is received. The third ESL 9 recognizes using the lowest-value byte B0 (Hex 00) of its hardware address that the time slot determined for itself belongs in the present, time slot cycle already in the past and consequently the next time slot with the time slot symbol Hex 00 is not to be expected until in the next time slot cycle and calculates that the instantaneously recognized time slot Z2 lies by one time slot next to its original time slot Z1, which is designated in the following as a time slot difference. In the third ESL 9 its time control stage is now programmed so that the new wakeup time TA2 is before the occurrence of the first time slot Z1 of the following time slot cycle, as in the case of an ESL with this lead time DV present in the synchronous state. The dwell time DSA to be expected in the sleep state S is automatically calculated. Therefore, the third ESL 9 is again in the synchronous state, which is indicated by the second arrow P2 with a continuous line and changes from the active state E into the sleep state S in order to change after the passage of the dwell time DSA at the new wakeup time TA2 back into its active state E.

The architecture of the ESL 8 as a representative for the ESL's 2-19 and visualized in FIG. 3 will be discussed in the following.

The ESL 8 comprises a processing stage 31 for making operating states available such as, e.g., the active state and the sleep state. The processing stage 31 comprises a microcontroller which has an internal memory 32 and a coprocessor 33 which is coupled to the transmitting/receiving means 34 for communicating with the base station 25, 26. The processing stage 31 is coupled via a first bus system 35 to an external memory 36 and to a display device 38, The display device 38 comprises its own microcontroller 39 for display-related data processing and comprises an electronic ink-based display 40 for visualizing information 41.

A voltage supply stage 42 realized by a battery 42 makes a first supply voltage VCC1 opposite a reference potential GND available for the described electronic components. The described electronic components are characterized in FIG. 3 as display module 43. The coprocessor 33 and the transmitting/receiving means 34, of which only an antenna is symbolically visualized, form a first radio interface 44 for the communication according to the previously described timeslot communication protocol. With the aid of the first radio interface 44 a product data set PD and an availability data set VD can be transmitted from the base station 25, 26 to the particular ESL 2-19.

However, the ESL 8 also comprises a second radio interface realized with the aid of an NFC module 45. The NFC module 45 comprises analog components 46 to which the inductive coupling components 47, visualized as a coil, for the contactless communication with another NFC-capable device (visualized in FIG. 4 as barcode device 57) and the voltage supply components 48 belong. Given the presence of an inductive coupling, the voltage supply components 48 generate a second supply voltage VCC2 opposite the reference potential GND for supplying the NFC module 45, which makes possible the operation of its digital components. The digital components are realized with the aid of a second microcontroller 49 which also comprises an internal memory 50 and is connected to the analog components 46 for communication according to an NFC communication protocol. The NFC module 45 is connected by a second bus 51 to the display module 43, in particular to the first microcontroller 31. The operating system of the NFC module 49 can be stored in the internal memory 50 or also in one of the memories 36, 32 of the display module, which can be accessed by the second microcontroller 49. As soon as it has been finished, it makes the NFC communication protocol available.

Figure 3:
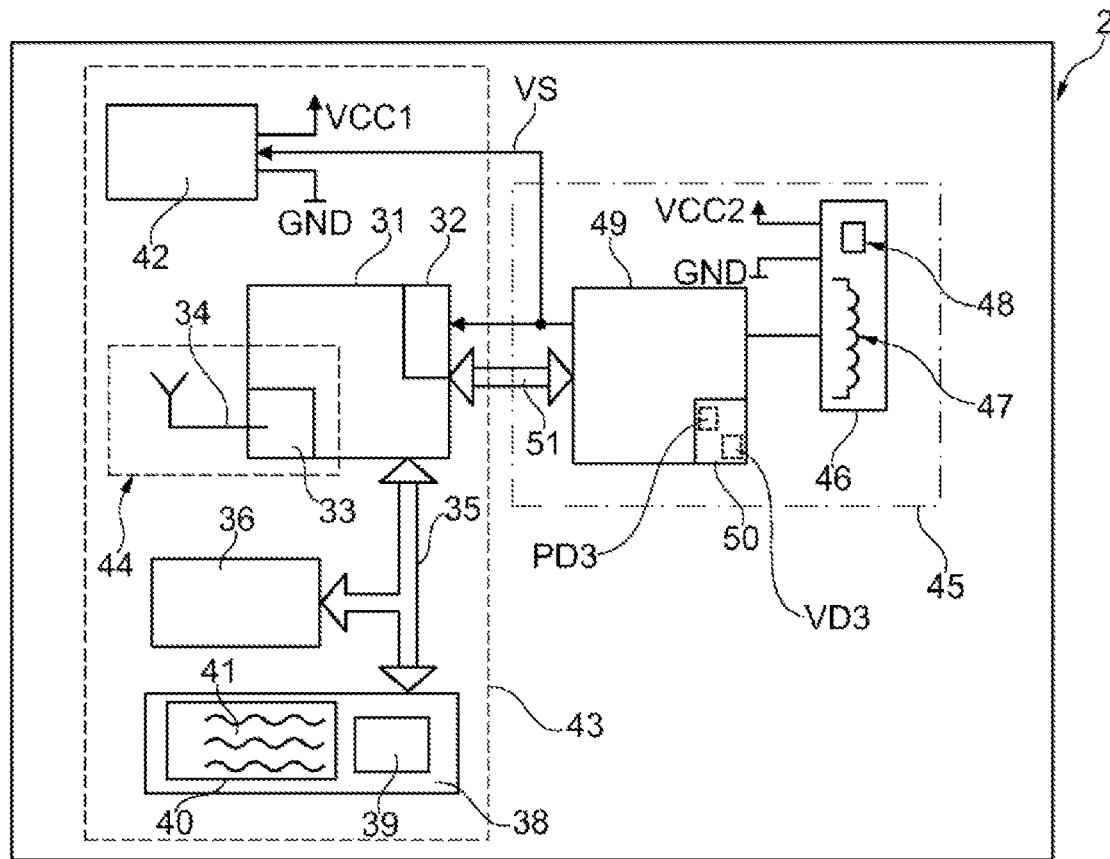
FIG. 3 shows a block diagram of a display device according to the invention.

The individual product data set PD and the availability data set VD, characterized in FIG. 3 as PD3 and VD3, are written with the aid of the first microcontroller 31 into the inner memory 50 of the NFC module in order to be available there independently of the activity behaviour of the display module 43 in time.

The previously described system components form substantially stationary, that is, fixed installed components of a self-checkout system. ESL 13 stores a first product and availability data set PD1 and VD1, ESL 2 stores a second product and availability data set PD2 and VD2, and ESL 8 stores the third product and availability data set PD3 and VD3. In the present instance a start is made from the fact that the three availability data sets VD1-VD3 indicate an unlimited availability of the associated product data sets PD1-PD3. Each of the product data sets PD1-PD3 can be queried with the aid of a self-checkout request.

A smart, phone 57 shown in FIG. 1 at three different points in time at three positions I, II, III immediately adjacent to the ESL's 2, 8, 13 and within their NFC communication range realizes a mobile self-checkout device.

Figure 4:
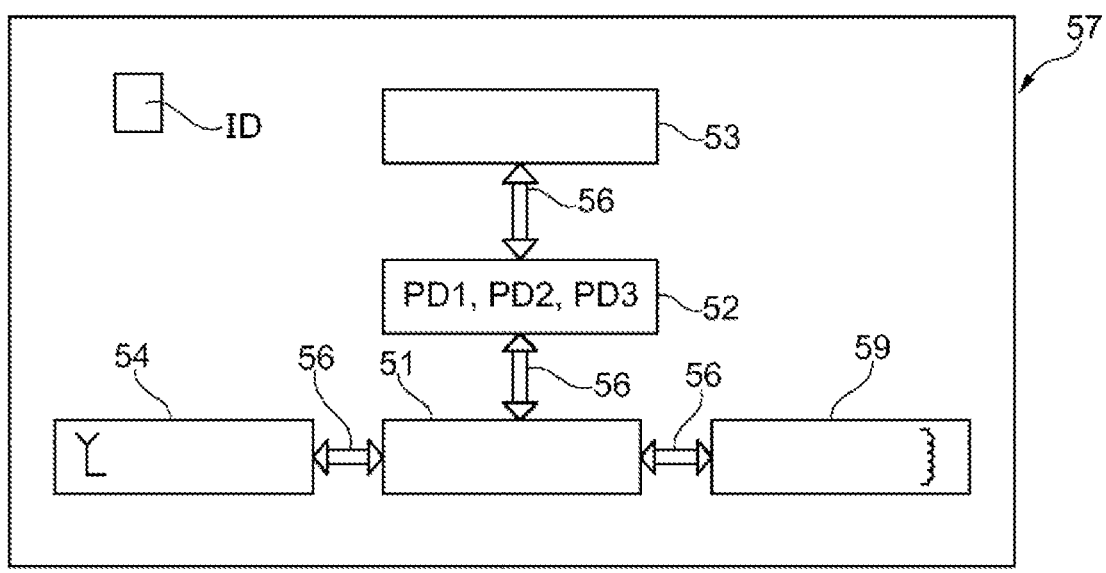
FIG. 4 shows a block diagram of a self-checkout, device according to the invention.

The smart phone 57 comprises, as is shown in FIG. 4, a mobile radio interface 54 for communication in a mobile radio network of the mobile radio operator, comprises an NFC-capable device radio interface 59 for communication with the NFC module 45, comprises a control stage 51 for controlling a self-checkout request, comprises a detection stage 53 for detecting a confirmation of a user realized with the aid of a fingerprint sensor 61 visible in FIG. 1, and comprises a product list storage stage 52 for storing one or product data sets PD which were received from an ESL 2-19 as the result of the self-checkout request. A data bus 56 connects the components 51, 52, 53, 54 and 59. The control stage 51 also comprises a touchscreen display 60 visualized in FIG. 1 which the aid of which plain text information KT1-KT3 (see FIG. 1) for the product data sets PD1-PD3 received by the ESL's 13, 2, 8 are visualized.

The smartphone 57 also stores device identification data ID which is also transmitted during the communication via the particular interface.

A user (not shown) of the smartphone 57 moves during his shopping tour through the store visualized in FIG. 1 and positions the smartphone 57 at first at the position Lan NFC communication with the NFC module 45 of the ESL 13 is built up, e.g., at any communication time TK shown in FIG. 1, a self-checkout request is transmitted from the smartphone 57 with indication of the device identification data. ID to the ESL 13, the first product data set PD1, which is characterized as available in an unlimited manner by the first availability data set VDI, is read out by the NFC module 45 and transmitted to the smartphone 57 by NFC communication, where its plain text information KT1 (product and price) characterized as a new item is visualized between angle brackets on display 60, and the fingerprint of a finger 62 of the user is checked with the aid of the detection stage 53 as an agreement for the self-checkout, and given the presence of a positive checking result, the first product data set PD1 is stored with the aid of the product list storage stage 52. The product is taken before or after by the user from the shelf location where the ESL 13 is mounted and is placed in the shopping cart.

The smart phone 57 is then moved to the ESL 2 where the previously described process of self-checkout is carried out again for the second product data set PD2. In a further progression the smart phone 57 is moved to the ESL 8 and the self-checkout process is carried out for a last time so that the three product data sets PD1-PD3 are now present in the smart phone 57.

Depending on the implementation, a payment transaction is carried out for each of the product data sets PD1-PD3 immediately upon its storage or for all three together, concluding a common payment transaction.

Figure 5:
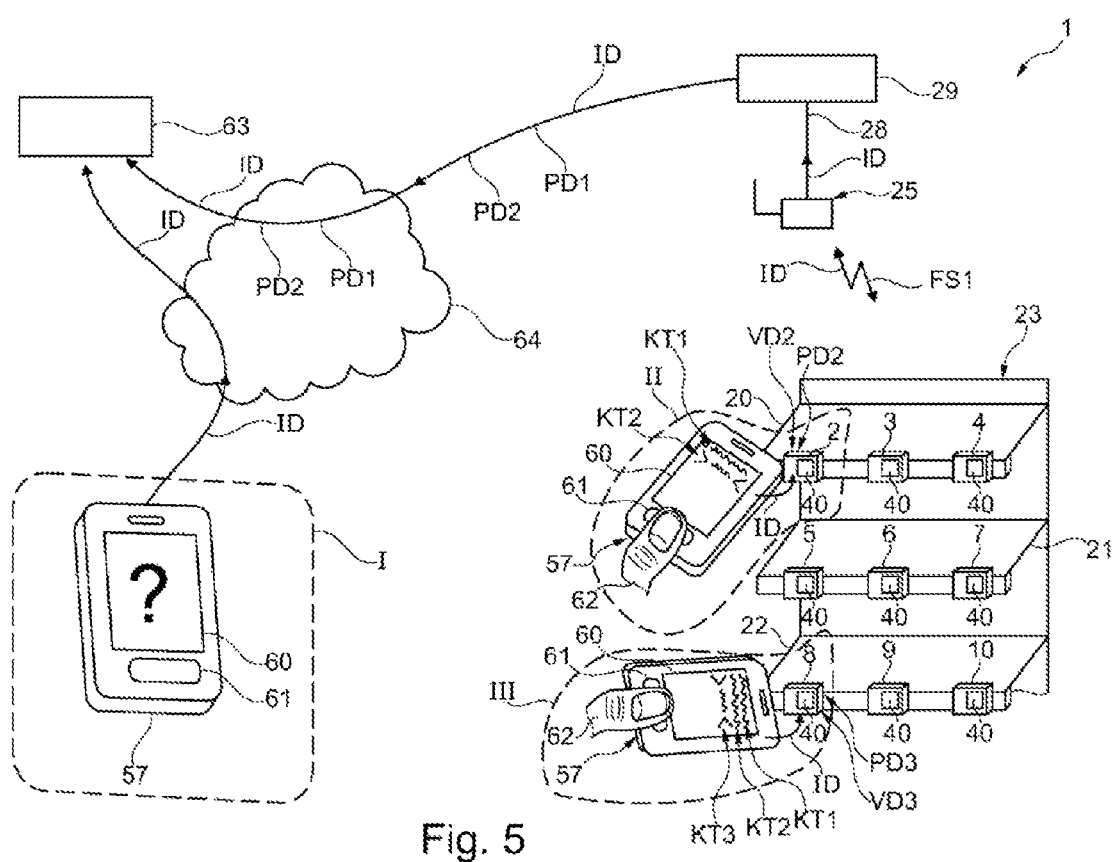
FIG. 5 shows a second exemplary embodiment of the system.

FIG. 5 shows a self-checkout system with a search engine feedback function wherein the left half of the self-service store shown in FIG. 1 was omitted for reasons of clarity. The smart phone 57 is at first used, e.g., at a position I outside of the supermarket rooms for a product information search, wherein an Internet-based search engine 63 is contacted with the search request and the device identification ID via the Internet 64. The search request concerns details about the product characterized in the supermarket by the ESL 2. This search request together with the device identification data. ID and the search result is stored in the search engine 63. At a later point in time the user of the smartphone 57 makes a self-checkout request in the rooms of the supermarket at the ESL 2 and confirms the self-checkout (e.g., payment for the particular product). Then, in the next active state the device identification data ID is transmitted by the ESL 2 to the base station 25 and from there to the merchandize management system server 29 of the supermarket, where the connection between the product which is associated with the ESL 2 and the ESL 2 is also known. The server 29 then forwards a product identification, e.g., the first product display arrangement PD 1 together with the device identification data ID to the search engine 63, where the information gap between the search request for a product and/or the search result and the actual product purchase can be closed by the feedback of the ESL 2.

In the meantime, advertising related to the original search request and regarding the sought product or regarding the general user behavior of the user can have been transmitted to the smartphone 57. Whether this advertising led or not to another purchase can now also be determined with the described measures. If the advertising concerns, e.g., the product characterized with the aid of the ESL 8 and the user also makes the self-checkout process for this product, the question posed can be positively answered with the aid of the feedback by the ESL 8 in the search engine.

Figure 6:
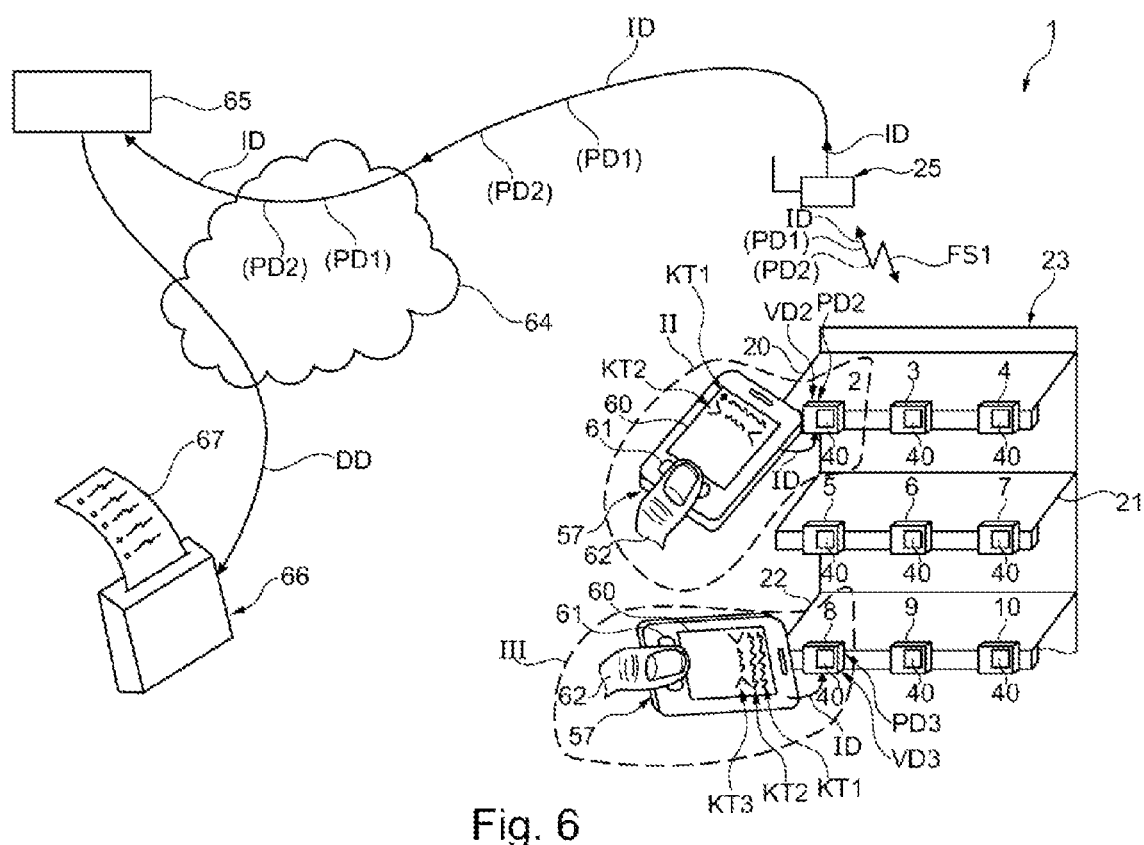
FIG. 6 shows a third exemplary embodiment of the system.

A cloud- or internet-based merchandize management system can also be realized with the aid of the feedback functionality of the ESL 1-19 in which the functionality of the server 29 shown in FIG. 1 is shifted into a data processing system 65 of a provider for stored merchandise management services. In every self-checkout procedure the device identification data ID is directly supplied from the base station to the remote data processing system 65. A connection is known there between the particular ESL 2-19 supplying the device identification data ID and between the products associated with them, as a consequence of which the product data sets PD1-PD19 are also present there. If the product data sets are not known there, they can be supplied to the data processing system 65 as is indicated in FIG. 6 for the product data sets PD1 and PD2 in brackets. From there, a receipt printer 66 locally installed in the supermarket and with print data DD can be controlled via the Internet 64 and a sales receipt 67 can be printed which comprises all products for which a payment transaction was carried out.

The invention also allows the self-checkout of products by weight whose price is not established until by weighing the product. Therefore, e.g., a network-capable balance can be provided with an ESL according to the invention (see FIG. 3). The product is placed on the balance by the customer, the customer selects the product or the product class on the balance screen, the balance determines the weight and prepares and transmits the product data set with the aid of the base station to the ESL with which the balance is provided. As already explained in detail, the user now performs a self-checkout request with the aid of his smartphone 57 in this ESL, as a result of which the product data set of the product by weight is transmitted to the smartphone 57. The availability data set can be used to make the concerned product data set retrievable only once and to cancel it in any case after a previously set time period if the self-checkout request does not occur (e.g., 30 seconds) in order to make the balance able to be used as quickly as possible for the next weighing process.

According to another, not shown exemplary embodiment of the invention, the identification data ID can be queried by the self-checkout device 57 upon entering a self-service store with the aid of a suitable terminal and transmitted to the merchandize management system. Individual product data sets PD are transmitted for the particular user or his device to all or to selected ESL's in order to make available individualized offers available for this user (e.g., according to his previous shopping behavior). The availability of the individual product data sets for the particular device 57 is, as already discussed, controlled with the aid of the availability data set VD. The individual product data sets PD are therefore transmitted upon a self-checkout request only to this particular device 57. For other devices, other product data sets are stored in the ESL's and transmitted upon a self-checkout request to the requesting device.

In general, it should be noted at this point that a payment transaction can be interpreted as an integral component of a self-checkout. Therefore, each self-checkout of a product can include a payment transaction for this product.

In conclusion, it is pointed out once more that the figures previously described in detail are only exemplary embodiments which can be modified by a person skilled in the art in many different ways without leaving the scope of the invention. It is also pointed out for the sake of completion that the use of the indefinite article "a" does not exclude that the features concerned can also be multiply present.

The invention claimed is:

1. A display device comprising
a memory stage configured to store a product data set which was received in a communication with a base station via a first radio interface of the display device, and
a second radio interface configured to perform RFID or NFC communication with a self-checkout device,
wherein the memory stage comprises an availability data set linked to the product data set and with the aid of which the availability of the product data set can be controlled, wherein the availability of the product data set concerns the availability of its amount, and
wherein the display device comprises a processor configured to process a self-checkout request received from the self-checkout device and transmit the product data set via the second radio interface,
wherein the availability concerns the product data set, and
the processor is configured to check the availability data set to determine whether the product data set can be transmitted, and to process the request accordingly.

2. A display device comprising
a memory stage configured to store a product data set which was received in a communication with a base station via a first radio interface of the display device, and
a second radio interface configured to perform RFID or NFC communication with a self-checkout device,
wherein the memory stage comprises an availability data set linked to the product data set and with the aid of which the availability of the product data set can be controlled, wherein the availability of the product data set concerns the availability of its amount,
wherein the display device comprises a processor configured to process a self-checkout request received from the self-checkout device and transmit the product data set via the second radio interface, and
wherein the processor is configured to check the availability data set to determine whether the product data set is limited in its amount, and to process the self-checkout request within the limitation of the amount with the product data set and, if the limitation of the amount is exceeded, to process the self-checkout request with another product data set, or not at all, or by internal registering and/or communication to a merchandise management system.

3. The display device according to claim 1, wherein the processor is configured to check the availability data set during the processing of the self-checkout request and to only transmit the product data set when it is available.

4. The display device according to claim 1, wherein the availability of the product data set concerns an availability in time in which the product data set is available, and the processor is configured to check the availability data set to determine whether the product data set is available limited in time, and to process the self-checkout request within the available time with the product data set, or outside of the availability in time with another product data set, or not at all, or by internal registering and/or communication to a merchandise management system.

5. The display device according to claim 1,
wherein the processor is configured to receive and store user and/or device identification data for identification of a user of the self-checkout device and/or of the self-checkout device when processing the self-checkout request.

6. A display device comprising
a memory stage configured to store a product data set which was received in a communication with a base station via a first radio interface of the display device, and
a second radio interface configured to perform RFID or NFC communication with a self-checkout device,
wherein the memory stage comprises an availability data set linked to the product data set and with the aid of which the availability of the product data set can be controlled, wherein the availability of the product data set concerns the availability of its amount,
wherein the display device comprises a processor configured to process a self-checkout request received from the self-checkout device and transmit the product data set via the second radio interface, and
wherein the processor is configured to receive and store user and/or device identification data for identification of a user of the self-checkout device and/or of the self-checkout device when processing the self-checkout request and configured to check the availability of the amount, taking into account a limitation of the amount per user or per self-checkout device.

7. The display device according to claim 4, wherein the processor is configured to receive and store user and/or device identification data for identification of a user of the self-checkout device and/or of the self-checkout device when processing the self-checkout request and configured to check the availability in time, taking into account a limitation of the amount per user or per self-checkout device.

8. The display device according to claim 5,
wherein the processor is configured to deliver the identification data to the base station during communication via the first radio interface.

9. The display device according to claim 8, wherein
the processor is configured to deliver only the identification data to the base station for which a confirmation of the user of the self-checkout device is present as a consent for storing the product data set received by the display device, the confirmation being for carrying out a payment transaction for the product data set.

10. A self-checkout system, comprising
a base station configured to communicate with at least one display device, and
at least one display device according to claim 1, and
the self-checkout device, which comprises:
a device radio interface which is compatible with the second radio interface of the display device for the RFID or NFC communication, and
a control stage configured to control the self-checkout request via the device radio interface to the display device for transmitting a product data set from the display device via the device radio interface to the self-checkout device.

11. The display device according to claim 1, wherein the processor is further configured to make an individual product data set available in a spatially localized manner in a self-checkout system for local transmission of the product data set from the display device to the self-checkout device, and
the self-checkout device comprises:
a device radio interface which is compatible with the second radio interface of the display device for the RFID or NFC communication, and
a control stage configured to control the self-checkout request via the device radio interface to the display device for transmitting the product data set from the display device to the self-checkout device via the device radio interface.

* * * * *